(12) United States Patent
Hazari et al.

(10) Patent No.: US 10,223,284 B2
(45) Date of Patent: Mar. 5, 2019

(54) FLEXIBLE I/O DMA ADDRESS ALLOCATION IN VIRTUALIZED SYSTEMS

(71) Applicant: International Business Machines Corporation, Armonk, NY (US)

(72) Inventors: Rama K. Hazari, Hyderabad (IN); Sakethan R. Kotta, Hyderabad (IN); Srinivas Kotta, Hyderabad (IN); Eric N. Lais, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/798,549

(22) Filed: Jul. 14, 2015

(65) Prior Publication Data

US 2017/0017579 A1 Jan. 19, 2017

(51) Int. Cl.
*G06F 12/10* (2016.01)
*G06F 12/1081* (2016.01)
*G06F 9/455* (2018.01)

(52) U.S. Cl.
CPC ...... *G06F 12/1081* (2013.01); *G06F 9/45558* (2013.01); *G06F 2009/45579* (2013.01); *G06F 2009/45583* (2013.01)

(58) Field of Classification Search
CPC ...... G06F 12/10; G06F 9/455; G06F 12/1081; G06F 9/45558; G06F 2009/45583; G06F 2009/45579
See application file for complete search history.

(56) References Cited

U.S. PATENT DOCUMENTS

2014/0129797 A1* 5/2014 Arndt .................. G06F 12/1081
　　　　　　　　　　　　　　　　　　　　　　　711/206
2016/0314009 A1* 10/2016 Tsirkin ................ G06F 9/45545

OTHER PUBLICATIONS

Mell et al., "The NIST Definition of Cloud Computing", Recommendations of the National Institute of Standards and Technology, U.S. Department of Commerce, Special Publication 800-145, Sep. 2011, 7 pages.

* cited by examiner

*Primary Examiner* — David Yi
*Assistant Examiner* — Zubair Ahmed
(74) *Attorney, Agent, or Firm* — Jared C. Chaney

(57) ABSTRACT

A system can translate an input/output (I/O) direct memory access (DMA) address to a physical system memory address in a data processing system. In response to receiving a DMA packet containing a requester identity (RID) associated with a partitionable endpoint (PE) number and an I/O DMA address, the system can retrieve an entry associated with the RID from a first translation validation table (TVT). Using that entry, the system can validate the number of TVT entries and extract from the I/O DMA address an offset. This offset can be validated and used to retrieve an entry in a second TVT. Data from this entry can be validated and the system can use this to access another table to retrieve the translation to the physical system memory address.

7 Claims, 8 Drawing Sheets

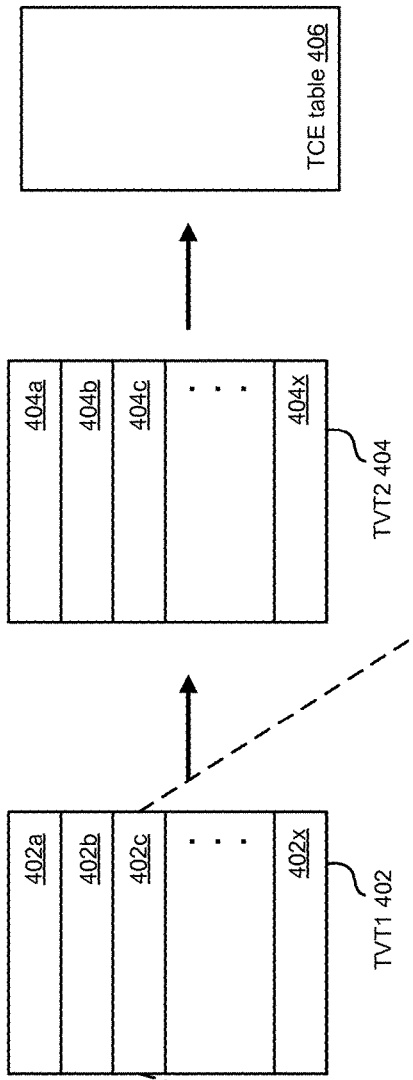
FIG. 4A
FIG. 4B
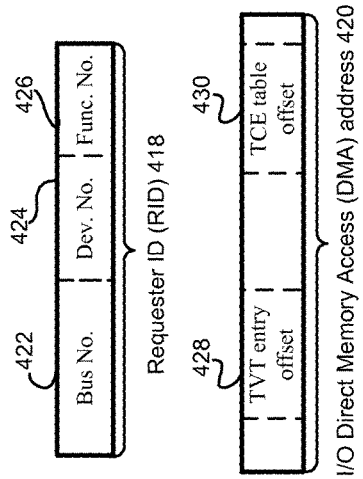
FIG. 4C
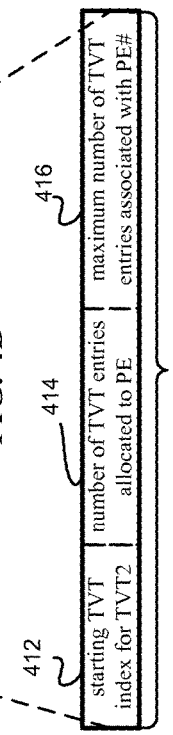

FLEXIBLE I/O DMA ADDRESS
ALLOCATION IN VIRTUALIZED SYSTEMS

BACKGROUND

The present disclosure relates to address translation, and more specifically, to direct memory access (DMA) translation in virtualized systems.

Modern computing systems, for example server class computers, can utilize DMA translation mechanisms to enable input/output (I/O) virtualization. DMA translation can also allow for the sharing of a physical I/O device across multiple operating system (OS) images. This can allow for access to large real or physical memories using smaller address sizes. Systems may also use DMA translation mechanisms to protect some areas of system memory. For example, memory containing an OS kernel or hypervisor may be protected from unauthorized DMA.

Direct memory access in virtualized environments may require software or firmware to generate a table of translations between the address presented to a DMA controller and the actual target address in the system memory.

SUMMARY

Embodiments of the present disclosure may be directed toward a computer-implemented method for translating an input/output (I/O) direct memory access (DMA) address to a physical system memory address in a data processing system. The system can receive a requester identity (RID) associated with a partitionable endpoint (PE) number from an I/O device. The system can also receive an I/O DMA address, which comprises a translation validation table entry (TVE) offset and a translation control entry (TCE) table offset. The system can then retrieve a TVT1 entry associated with the PE number. The TVT1 entry can be retrieved from a first translation validation table (TVT1). The TVT1 entry can have a starting TVT index for a second translation validation table (TVT2), an entry value which indicates a number of TVT entries allocated to the PE number, and a maximum size of a TCE table for TVT entries belonging to the PE number. The system can validate the maximum size of a TCE table value based on the TVT1 entry, and extract the TVE offset. The TVE offset can then be validated based on the entry value. The system can assign the extracted TVE offset from the I/O DMA address as the offset from the TVT1 entry index to access a corresponding entry in the TVT2, and access the corresponding TVT2 entry using the offset from the TVT1 entry index. The TVT2 entry may comprise a TCE table base address. The system can validate the TVT2 entry and access a TCE table entry using the TCE table offset. Finally, the system can retrieve the physical system memory address using the TCE table entry.

Embodiments of the present disclosure may be directed toward a computer system for translating an input/output (I/O) direct memory access (DMA) address to a physical system memory address is a data processing system. The system may include a first translation validation table (TVT1) and a second translation validation table (TVT2). The system may also have at least one translation control entry table (TCE table). The system may also have at least one processor configured to receive a requester identity (RID) association with a partionable endpoint (PE) number from an I/O device. The system's processor may also be configured to receive an I/O DMA address from an I/O device. The I/O DMA address may have a translation validation table entry (TVE) offset and a translation control entry (TCE) table offset. The system's circuit may be configured to retrieve a TVT1 entry associated with the PE number from the TVT1, based on the PE number. The TVT1 entry can include a starting TVT index for the TVT2, an entry value, where the entry value indicates a number of TVT entries allocated to the PE number, and a maximum size of a TCE table for TVT entries belonging to the PE number. The processor can be configured to validate the maximum size of a TCE table value based on the TVT1 entry associated with the PE number. It can then extract the TVE offset from the I/O DMA address in response to the validating. The extracted TVE offset can then be validated based on the entry value from the TVT1 entry. The extracted TVE offset can then be assigned as the offset from the TVT1 entry index to access a corresponding entry in the TVT2 based on the validating. The corresponding entry in the TVT2 can then be accessed. The TVT2 entry can contain a TCE table base address. The TVT2 entry can be validated, and based on the validating and using the TCE table offset, a TCE table entry can be accessed. The physical system memory address can be retrieved based on the TCE table entry.

Embodiments of the present disclosure may be directed toward a computer program product for translating an input/output (I/O) direct memory access (DMA) address to a physical system memory address in a data processing system. The computer program product may have a computer readable storage medium with instructions embodied therewith. The computer readable storage medium is not a transitory signal per se. The program instructions may be executable by a computer processing circuit to cause the circuit to perform a method. The method can begin when a requester ID (RID) associated with a partitionable endpoint (PE) number and an I/O DMA address are received from an I/O device. The I/O DMA address may contain a translation validation table entry (TVE) offset and a translation control entry (TCE) table offset. A TVT1 entry associated with the PE number may be retrieved from the first translation validation table (TVT1). The TVT1 entry may include a starting TVT index for a second translation validation table (TVT2), an entry value, where the entry value indicates a number of TVT entries allocated to the PE number, and a maximum size of a TCE table for TVT entries allocated to the PE number. The maximum size of a TCE table value may be validated based on the TVT1 entry associated with the PE number. The TVE offset can be extracted from the I/O DMA address in response to the validating. The extracted TVE offset can then be validated based on the entry value from the TVT1 entry. The extracted TVE offset can then be assigned as the offset from the TVT1 entry index to access a corresponding entry in the TVT2. The corresponding entry in the TVT2 can be accessed based on the offset from the TVT1 entry index. The TVT2 entry may include a TCE table base address. Upon validation of the TVT2 entry, a TCE table entry can be accessed using the TCE table offset from the I/O DMA address. Using the TCE table entry, the physical system memory address can be retrieved.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A depicts data structures involved in the translation of a DMA address to a physical address, consistent with embodiments.

FIG. 4B depicts an entry of a first translation validation table (TVT1), consistent with embodiments.

FIG. 4C depicts elements of a direct memory access (DMA) packet that could be received from an I/O subsystem, consistent with embodiments.

Figure 1:
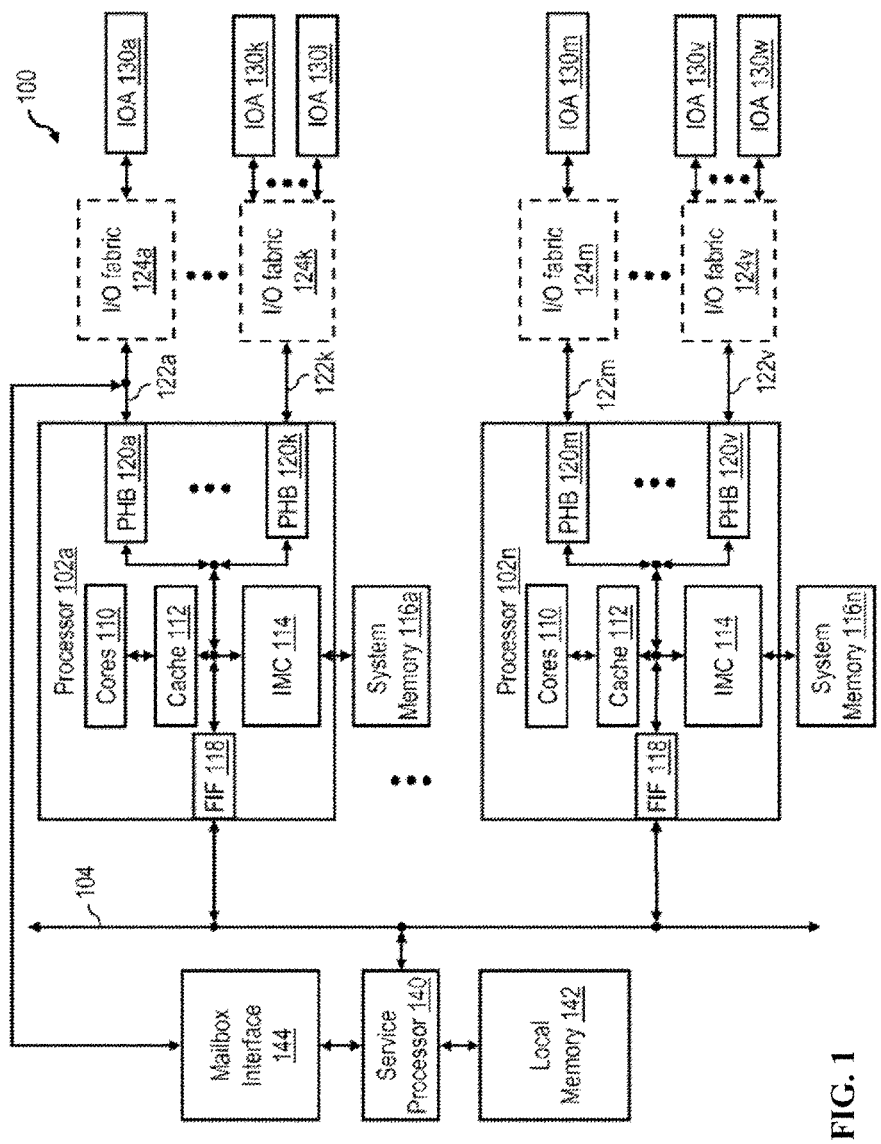
FIG. 1 depicts a high level block diagram of a data processing system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, more particular aspects relate to direct memory access (DMA) translation in virtualized systems. While the present disclosure is not necessarily limited to such applications, various aspects of the disclosure may be appreciated through a discussion of various examples using this context.

DMA in computer systems can allow certain hardware associated with the system to access the main system memory independent of the central processing unit (CPU). DMA channels can allow for the transfer of data to and from devices with less CPU overhead than systems that do not use DMA channels. Many hardware devices including disk drive controllers, graphics cards, network cards, and sound cards use DMA. To carry out an input/output (I/O) DMA operation, a host processor can initialize the DMA controller. The system can then send commands to a peripheral device to initiate the data transfer. The DMA controller can then provide addresses and read/write control lines to the system memory. Each time a unit of data is ready to be transferred between the peripheral (I/O) device and memory, the DMA controller can increment its internal address register the I/O DMA operation is completed.

DMA translation mechanisms may be used by modern computing systems. In DMA translation mechanisms, each 4 KB page of physical system memory may be associated with a corresponding region (i.e. page) of I/O bus DMA address space. This may allow for address translations from an I/O bus DMA address space to physical system memory locations.

System hardware that is a target location of a DMA operation from an I/O device can use the incoming DMA page address on the I/O bus to retrieve, from a translation table, a translation from the DMA page address to the physical system memory page address. For example, a Peripheral Component Interconnect Express (PCIe) Host Bridge (PHB) may use an incoming DMA page address to retrieve the translated physical address.

A PCIe Host Bridge (PHB) may attach a PCIe bus to the larger system. The PHB hardware can determine, for a given operation, the partitionable endpoint number(s) (PE#(s)) to which the operation belongs. The PHB can also keep track of the state of the PE#, for purposes of stopping the PE on an error and preventing further operations after the error. The PHB can do this on a per PE# basis.

The PHB can perform this function in DMA operations. In DMA operations, the PHB can use a requester identifier (RID) associated with the operation as an index into an RID Translation Table (RTT). In this instance, a PE# field of an RTT entry (RTE) can indicate the PE# associated with the RID, and thus the RID can be used as an index into the RTT to access the RTE.

A translation validation table (TVT) can comprise any number of translation validation table entries (TVEs). TVEs can be used to translate and validate an input/output adapter's (IOA's) access to a DMA address space. An IOA can be, for example, an electronic circuit, expansion card, plug-in module, or other device that accepts input and generates output in a particular format. Systems may provide for a bimodal option in the PHB, which can be switched on or off in order to allow for different storage demands (e.g., a greater or fewer number of TVEs). However, this bimodal option of address storage forces all PEs to be assigned to or select an equal number of TVEs. Thus, although the table may be able to accommodate very large or very small memory demands, each PE# must have the same assignment (e.g., each PE may be assigned the same amount of memory or address space). This may not accommodate for variations in demands amongst PE#s, and could require the system to accommodate the largest demand. This can in turn reduce flexibility and reduce the number of supported PEs for a given PHB. For example, if one PE required 8 entries, while each of two other PEs required only 4 entries, the bimodal system would assign 8 entries to each of the three PEs. Thus, rather than fitting 7 PEs in a 32 entry space (4 entries×6 PEs+8 entries×1 PE), the system could only support 4 PEs (8 entries×4 PEs).

Embodiments of the present disclosure may translate I/O DMA addresses using an additional hardware table. This additional hardware table (herein Translation Validation Table 1 (TVT1)) may be indexed by PE#s. Each entry or row in the TVT1 may contain the following: (a) an index to a TVE in a second translation validation table (TVT2), (b) a number of TVEs allocated to the particular indexing PE value; and (c) a maximum size of translation control entry (TCE) table for any of the TVEs belonging to the indexed PE. The number in (a), the index into the TVT2, can point to an already existing translation validation table. The TVE indexed by (a) may be a starting TVE for the indexing PE value.

The second value in the entry, (b) a number of TVEs allocated to the indexing PE value, may include the number of TVEs in TVT2 that is allocated to the indexing PE value, starting with the TVE index by the value from (a). In various embodiments, the size of TVT2 may be 512 entries. An I/O DMA address must map to one of these 512 TVEs. Consequently, the possible values for field (b) (and hence, the possible number of TVTs that can be allocated to the indexing PE values) can be 1, 2, 4, 8, 16, 32, 64, 128, 256, or 512. In order to reduce the size of the entries in TVT1 (e.g., the number of bits allocated to each entry), field (b) can encode the values as 0, 1, 2, 3, 4, 5, 6, 7, 8, 9, respectively. For example, if a PE# contains 4 TVEs, then field (b) could be 2 (i.e., the number of TVEs is $2^2$ for the indexing PE). As mentioned, field (b) can also be 0, indicating that the indexing PE selects only $2^0$ or 1 TVE. This allows for flexibility in allocating varying numbers of TVEs for any particular PE.

The final field in each TVT1 entry can be (c), a maximum size of TCE table for any of the TVEs belonging to the indexed PE. This can indicate the maximum size of the TCE table for any of the TVEs associated with the indexed PE#. Each TVE associated with a given PE# could have different TCE table sizes. The TCE table size for the PE can be a value in a field in each entry in the TVT2 table. The actual maximum size of the TCE table for any of the TVEs associated with the indexed PE# may need to be less than the TCE table size indicated in the field in the entry in the TVT1 table in order to be valid. The allocation and validation of the TCE table sizes for each PE# can be handled by a hypervisor. However, as described herein, fields in each entry may be validated independently as each field is accessed during the translation of the address from virtual to physical.

The aforementioned table (TVT1) could be added to the PHB hardware. The table could be combined with an already-existent table, the RTT. The RTT can be accessed in the DMA path initially to map the RID data to the PE#. In this way, there is no additional performance impact, despite the addition of a new table.

The new table could be incorporated into the DMA translation path and accessed in the following manner. First, a PE# could be obtained from an RID received from an I/O device. This PE# can be used as an index into the TVT1 to retrieve a TVT1 entry associated with the PE#. The entry in the TVT1 can contain a starting index for a TVT2 table. The system can validate the maximum size of a TCE table for any TVEs belonging to the PE number based on the TVT1 entry. Once the entry is validated, a TVE offset can be extracted from the received I/O DMA address. This value can then be compared with the number of TVEs field from the TVT1 entry. If it is valid, then the TVE offset extracted from the I/O DMA address can be used as an offset from the TVT1 entry index to access the appropriate TVE from the TVT2.

Using this offset from the TVT1 entry, the system can access the corresponding entry in the TVT2, and then the TVT2 entry can be validated. The system can then access the corresponding TCE table entry using the TCE table offset from the received DMA address. Based on the TCE table entry, the system can retrieve the physical memory address. There are a number of ways of handling the TCE entry to access the physical address, including using a real page number (RPN) field from the TCE entry. The physical address could then be used to access the requested data.

FIG. 1 depicts a high level block diagram of a data processing system 100, according to embodiments. The data processing system 100 can be, for example, a symmetric multiprocessor (SMP) system including a plurality of processors 102a-102n, each coupled for communication to a system fabric 104, which may include one or more bused or switched communication links. For example, data processing system 100 may be implemented with an IBM ESERVER. A data processing system with a single processor 102 may also be used.

Consistent with embodiments, each processor 102 may be realized as a single integrated circuit chip having a substrate on which semiconductor circuitry is fabricated. As shown, processor 102 includes a plurality of processor cores 110 that process data through the execution and/or processing of program code, which may include, for example, software and/or firmware and associated data. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) 118 by which processor 102 communicates with system fabric 104, as well as one or more host bridges supporting input/output communication with various IOAs 130. In the figure as shown, all of the host bridges are implemented as Peripheral Component Interconnect (PCI) host bridges (PHBs) 120, but in other embodiments the host bridges may implement one or more additional or alternative I/O bus standards.

PHBs 120a, 120k, 120m, and 120v provide interfaces to PCI local busses 122a, 122k, 122m, and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w, which may comprise, for example, a display adapter and hard disk adapter, are coupled to PCI local bus 122v optionally through I/O fabric 124v.

Data processing system 100 can further include a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM) and non-volatile memory (e.g., non-volatile random access memory (NVRAM) or static random access memory (SRAM))). Service processor 140 is further coupled to a mailbox interface 144 through which service processor 140 communicates I/O operations with PCI bus 122a.

The architecture and components of a data processing system can vary between embodiments. For example, other devices and interconnects may alternatively or additionally be used. Accordingly, the data processing system 100 in FIG. 1 is not meant to imply architectural limitations with respect to the disclosed.

Figure 2:
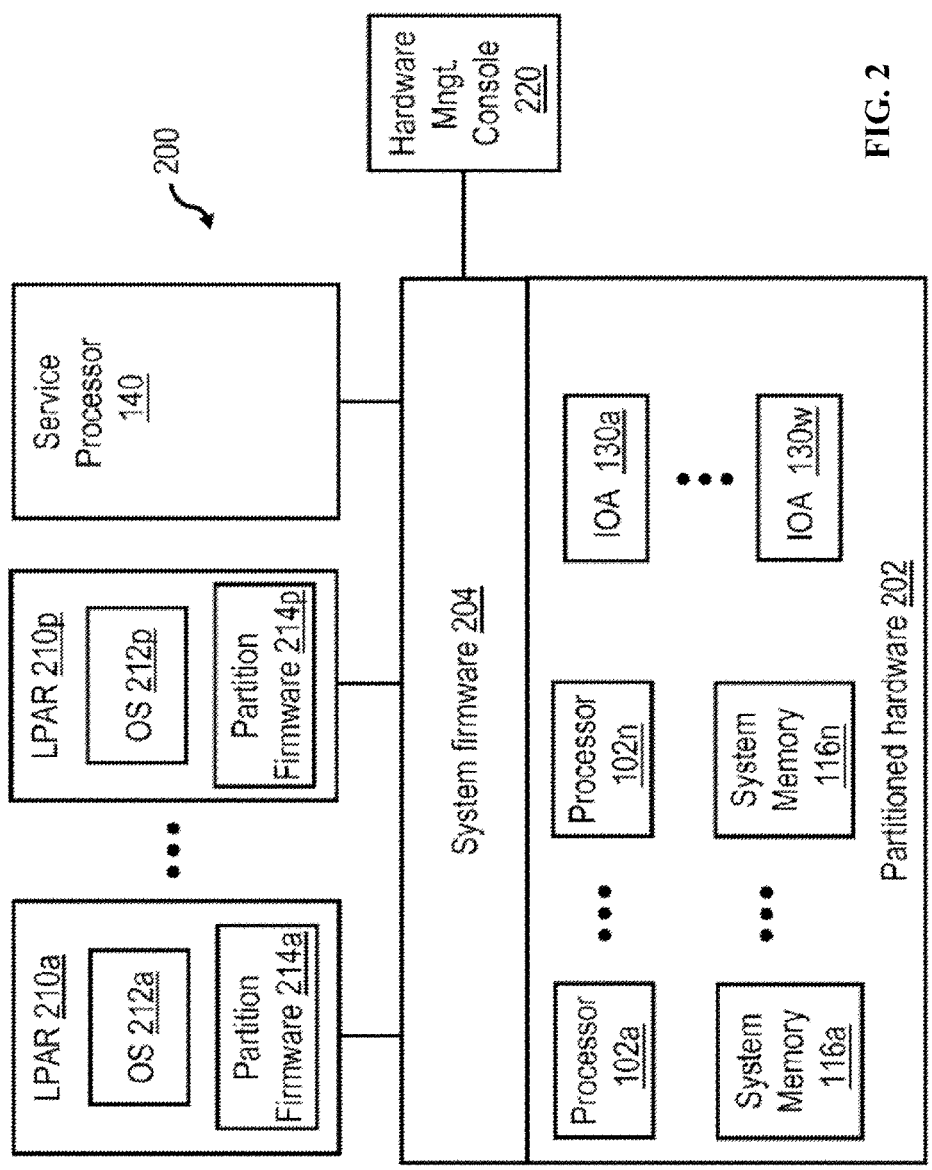
FIG. 2 depicts a logical view of a data processing system showing the hardware and software resources of the data processing system partitioned into multiple logical partitions (LPARs).

FIG. 2 depicts a logical view of a data processing system 200 showing the hardware and software resources of the data processing system partitioned into multiple logical partitions (LPARs). Data processing system 200 may have, for example, the same components and/or architecture as data processing system 100 in FIG. 1 and accordingly identifies common components with like reference numerals.

Data processing system 200 has a collection of partitioned hardware 202, including processors 102a-102n, system memories 116a-116n and IOAs 130a-130w. Partitioned hardware 202 may of course include additional unillustrated components, such as additional volatile or nonvolatile storage devices, ports, bridges, switches etc. The hardware components comprising partitioned hardware 202 (or portions thereof) can be assigned to various ones of logical partitions (LPARs) 210a-210p in data processing system 200 by system firmware 204, also referred to as a virtual machine monitor (VMM) or hypervisor. System firmware 204 supports the simultaneous execution of multiple independent operating system instances by virtualizing the portioned hardware of data processing system 200.

In addition to the hardware resources allocated by system firmware 204, each of LPARs 210a-210p includes a respective one of multiple concurrently executable operating system instances 212a-212p. In various embodiments, operating system instances 212a-212p, which may include, for example, instances of LINUX, AIX, and/or WINDOWS, may be homogenous or heterogeneous. Each LPAR 210 may further include unillustrated application programs, as well as a respective instance of partition firmware 214. When LPARs 210a-210p are instantiated, boot strap code is loaded onto partitions 210a-210p by system firmware 204. Thereafter system firmware 204 transfers control to the boot strap code, which can load firmware and software. The processor(s) 102 assigned to each LPAR 210 then execute the partition firmware 214 of that LPAR to bring up the LPAR and initiate execution of an OS instance 212.

In the logically partitioned environment shown in FIG. 2, service processor 140 can be used to provide various services, such as processing of errors in LPARs 210a-210p. These services may also function as service agents to report errors back to a system administrator or a vendor of data processing system 200. The operation of the different LPARs 210 may further be controlled through a hardware management console 220. Hardware management console 220 can be implemented as a separate data processing system from which a system administrator may perform various functions within data processing system 200 including creating and destroying LPARs 210, as well as reallocating hardware and software resources among LPARs 210.

Additionally, in a logically partitioned environment as shown, it may not be permissible for the hardware or software resources in one LPAR 210 to consume the resources of or affect the operations in another LPAR 210. Furthermore, to be useful, the assignment of resources to LPARs 210 needs to be fine-grained. For example, it is often not acceptable to assign all IOAs 130 under a particular PHB 120 (both from FIG. 1) to the same partition, as that may restrict configurability of the system, including the ability to dynamically reallocate resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system can be subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. A PE may be identified by its function rather than its structure.

Figure 3:
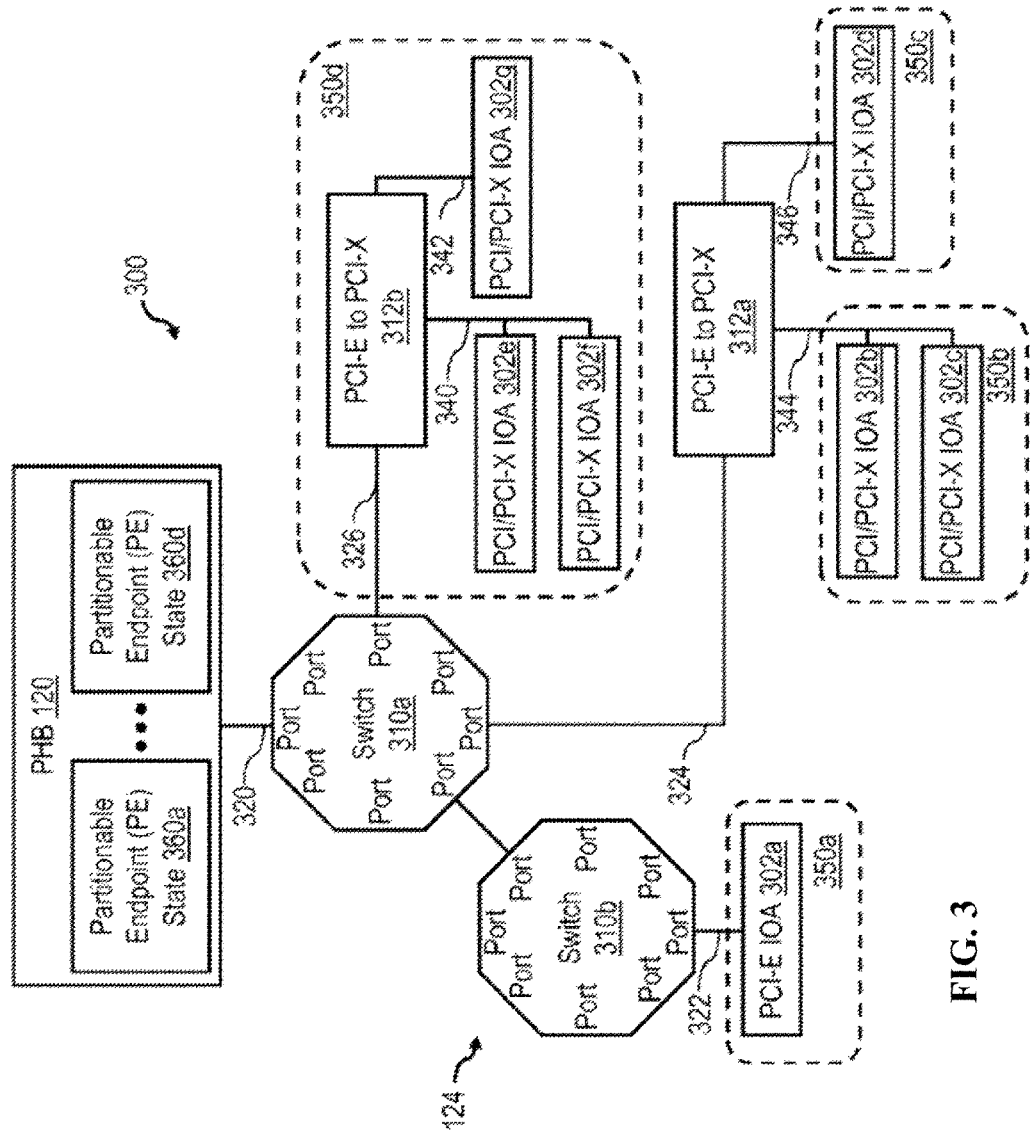
FIG. 3 depicts a block diagram of at least a portion of the I/O subsystem of a logically partitioned data processing system, such as a data processing system of FIG. 1, which exhibits resource isolation between LPARS, consistent with embodiments.

FIG. 3 depicts a block diagram of at least a portion of an I/O subsystem 300 of a logically partitioned data processing system, such as a data processing system 100 of FIG. 1, which exhibits resource isolation between LPARs, such as LPARs 210 in FIG. 2, consistent with embodiments. The I/O subsystem 300 depicted includes a PHB 120 coupled to a plurality of IOAs 302a-302g through an I/O fabric 124. I/O fabric 124 in turn includes switches 310a, 310b, PCI-express (PCI-e) busses 320, 322, 324, and 326. PCI bridges 312a and 312b, and secondary buses 340, 342, 344, and 346.

FIG. 3 groups various components of I/O subsystem 300 to form a plurality of PEs 350a-350d that are each independently assignable to any of the LPARs, such as any of the LPARs 210 in FIG. 2 of the data processing system. This grouping could be accomplished by system firmware (for example system firmware 204 in FIG. 2). PE 350a and PE 350c each includes a single IOA, namely, IOAs 302a and 302d, respectively. PE 350b, in contrast, comprises two IOAs, IOAs 302b and 302c that may need to be assigned to the same LPAR. PE 350d comprises three IOAs (e.g., IOAs 302e, 302f, and 302g) and PCI bridge 312b, which function together as a single PE and therefore must be assigned to the same LPAR 210. In some embodiments, a PE may include only a portion (e.g., one or more ports) of an IOA.

In I/O subsystem 300, the respective state of each PE, referred to herein as the partitionable endpoint state, is maintained in the PHB 120 associated with the I/O subsystem. The PHB 120 of I/O subsystem 300, for example, includes partitionable endpoint state registers 360a-360d, which correspond to and indicate the states of PEs 350a-350d, respectively.

System firmware such as system firmware 204 in FIG. 2 may assign each PE one or more domain numbers (or requester IDs (RIDs)) that associate component(s) of each PE with that PE. In embodiments, the domain number assigned to each PE includes a plurality of fields that can be used to differentiate between I/O components within a PE. For example, the fields in the domain number may include:

Bus number (Bus) field: provides the highest level of division between I/O resources, with each bus under a PHB having a unique bus number.

Device number (Dev.) field: provides an intermediate level of division between I/O resources, with each IOA on a given bus having a different device number.

Function number (Func.) field: provides the lowest level of division between I/O resources, with each distinct function of an IOA having a different function number.

The domain number (or RID) can support the division of the I/O resources down to the lowest level of I/O functionality.

FIG. 4A depicts data structures involved in the translation of a DMA address to a physical address, consistent with embodiments. In some systems, there may be other data structures (e.g., caches) preceding, succeeding, or intervening those depicted, e.g., caches. Only structures relevant to the present disclosure have been depicted. As mentioned herein, the table referred to as "TVT1" may be an addition to an existing RTT. The combined "TVT1" and RTT may be called the TVT1 402 for ease of discussion. TVT1 402 may contain any number of entries, here 402a, 402b, 402c to . . . 402x. An exemplar TVT1 entry 402c is shown in FIG. 4B and could also be an entry in TVT1 402. The TVT1 402 may be indexed by PE#. An RID received from an I/O device ties the requesting device to a particular PE#. The TVT1 402 could serve the purpose of the RTT, which is to determine the appropriate PE# for the RID, by being indexed by PE#. For example, the PE# can be determined from a lookup in the RTT (TVT1), as the system can use the RID as an index into the RTT portion of the TVT1, with the entry containing the PE# field. The PE# could then be associated with the other fields in the TVT1 entry 402c. Data from a particular TVT1 entry, for example one of 402a-x, can then be validated. For example, the maximum size of a TCE table for any TVEs belonging to the PE number from the TVT1 entry 402c can be validated. The validated portion of the TVT1 entry can then be used to access an appropriate entry in the TVT2 based, for example, on a TVE offset extracted from the DMA address. TVT2 404 may contain a number of entries, here 404a, 404b, 404c, through 404x. An appropriate entry in the TVT2 404 may be for example, entry 404a. Data from the appropriate TVT2 entry 404a can then be validated and used to access the appropriate entry in the TCE table 406. For example, a TVT2 entry 404a may contain a TCE table base address, which can be used to access the appropriate entry in the TCE table 406. The TCE entry can in turn be used to access the correct real or physical system memory address.

FIG. 4B depicts an entry of the TVT1, consistent with embodiments. FIG. 4B may be an entry 402c in the TVT1 402 of FIG. 4A, but is depicted in a more detailed view in FIG. 4B. As with the data structures in 4A, additional fields not depicted or described here may exist in the TVT1 entry. It should first be noted that the TVT1 402 is indexed by PE#, so each TVT1 entry will be associated with a PE#. Each TVT1 402 entry can also include: a starting TVT index for the TVT2 412, a number of TVEs allocated to the PE 414, and a maximum size of TCE table for any of the TVEs belonging to the indexed PE 416.

FIG. 4C depicts elements of a DMA packet that could be received from an I/O subsystem, consistent with embodiments. The elements depicted include a requester ID (RID) 418 and an I/O DMA address 420. The RID 418 may contain three fields, including a bus number 422, a device number 424, and a function number 426. These are three fields in the PCI/PCI-X/PCIe domain that can define an IOA function. The names and bit-width of each of the three fields are derived from the Bus (8 bits), Device (5 bits), and Function (3 bits) fields that can define the configuration address of an IOA function. In some embodiments, the Dev. No. 424 and the Function No. 426 may be combined into a single 8 bit Function field. An RID is attached to each PCIe transaction, and it can uniquely identify the requester of the transaction. A PHB validates RIDs of DMA requests and translates RIDs to particular PEs by reference to an entry in a TVT1.

The I/O DMA address 420 can also be included in the DMA packet received by the PHB from the IOA. The I/O DMA address can include a TVE offset 428 and a TCE table offset 430. The TVE offset 428 can be used, once validated, to identify a corresponding TVT2 entry from the data in the TVT1 table. The TCE table offset 430 can be used to identify and access the corresponding TCE table entry, as described herein.

Figure 5:
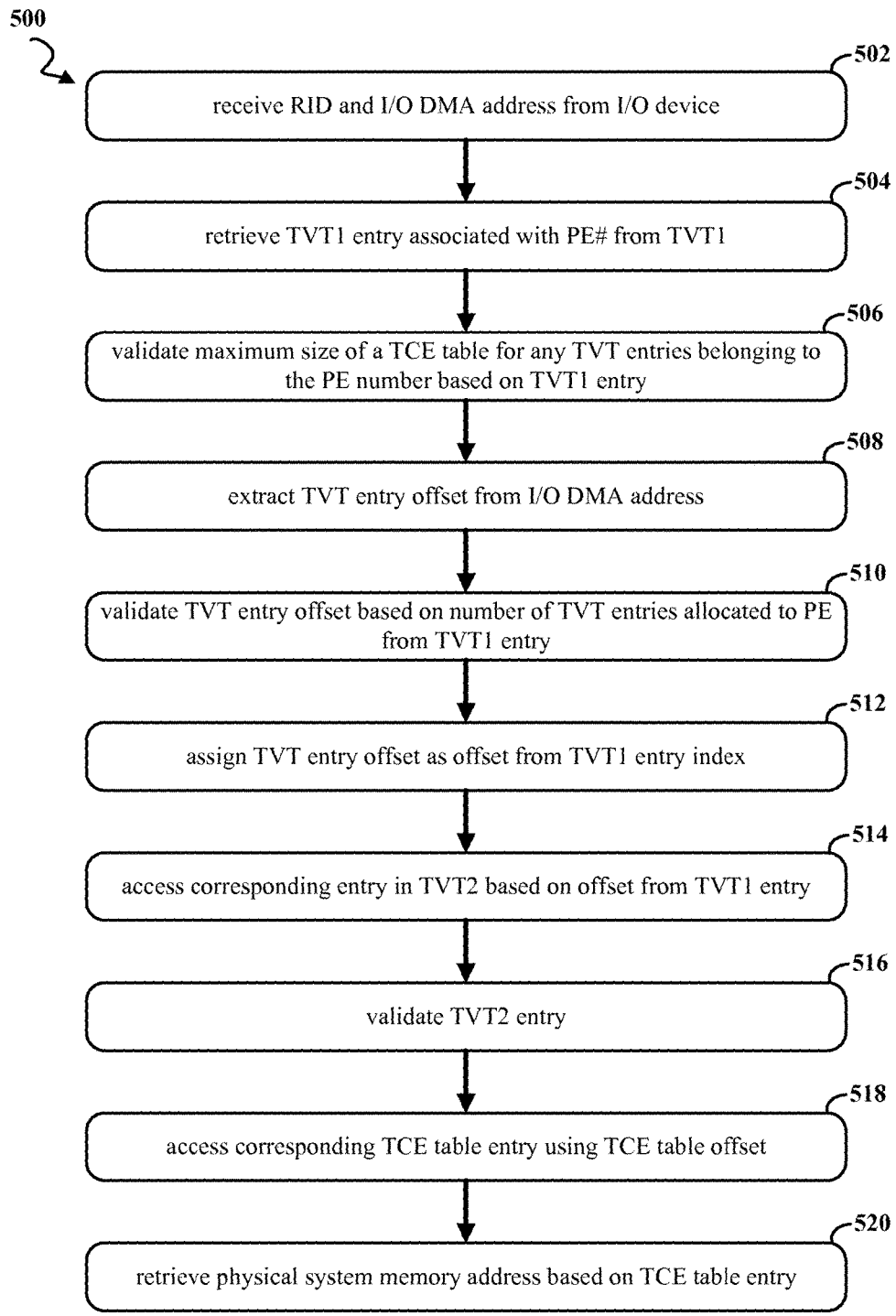
FIG. 5 depicts a flow diagram of a method for translating an I/O DMA address to a physical system memory address in a data processing system, consistent with embodiments.

FIG. 5 depicts a flow diagram of a method for translating an I/O DMA address to a physical system memory address in a data processing system. The method 500 can begin when a PHB receives a DMA packet, including an RID and an I/O DMA address from the I/O device (via an IOA), per 502. Using the RID, the PHB can access the PE# associated with the RID and retrieve the associated TVT1 entry from the TVT1, per 504. The PHB can then attempt to validate the maximum size of a TCE table for any TVEs belonging to the PE number, based on the data contained in the TVT1 entry, per 506. If the maximum size is successfully validated at 506, the PHB can extract the TVE offset from the received I/O DMA address, per 508. As noted in FIG. 4, the TVE offset can be included as a field in the DMA address. The PHB can then attempt to validate the TVE offset based on the number of TVEs allocated to the particular PE value, per 510. This value, as mentioned, can be a field in the TVT1 entry. If the offset is successfully validated, then the TVE offset can be assigned or designated as the offset from the TVT1 entry index, per 512. Based on the offset from the TVT1 entry (established in 512), the PHB can access the corresponding entry in the TVT2, per 514. The TVT2 entry can then be validated, per 516. Using the TCE table offset from the DMA address and data from the TVT2 entry, the system can access the corresponding TCE table entry, per 518, and based on that entry, retrieve the physical (real) system memory address, per 520.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
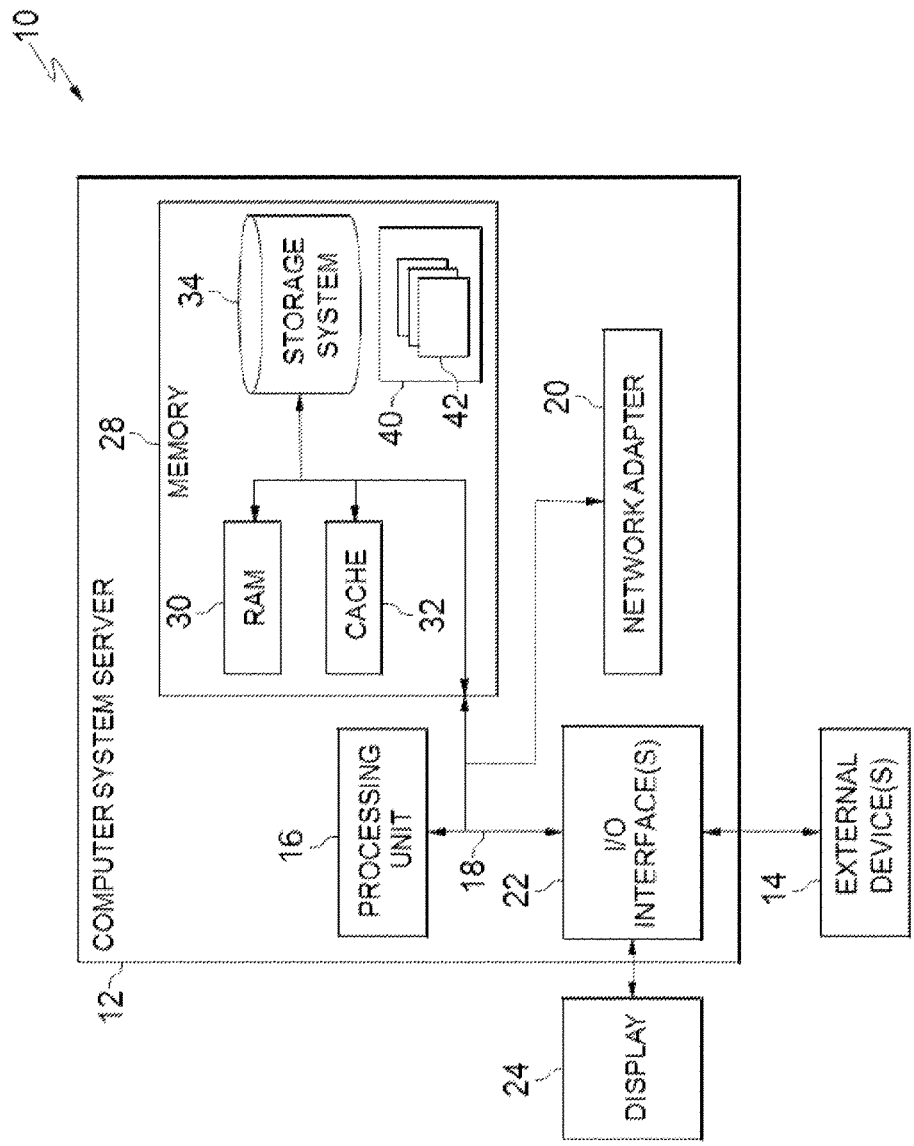
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
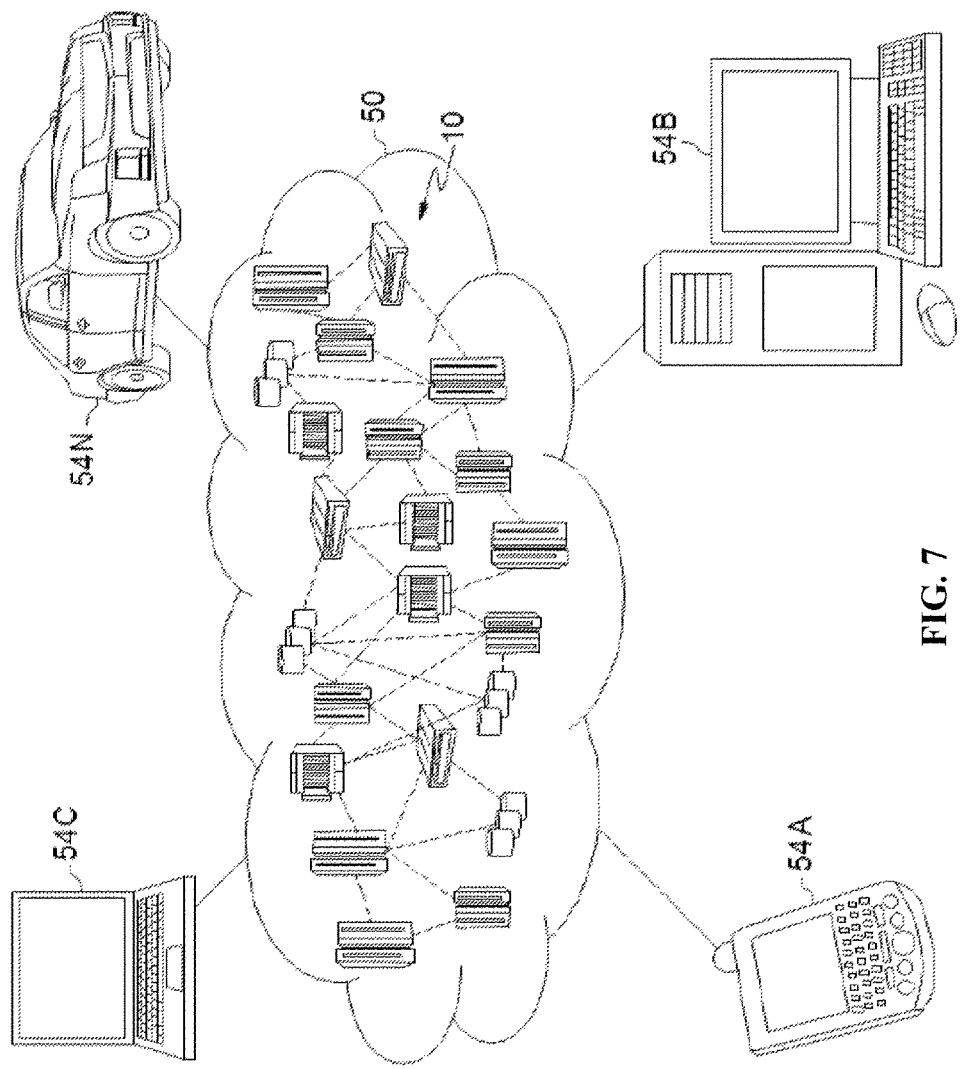
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
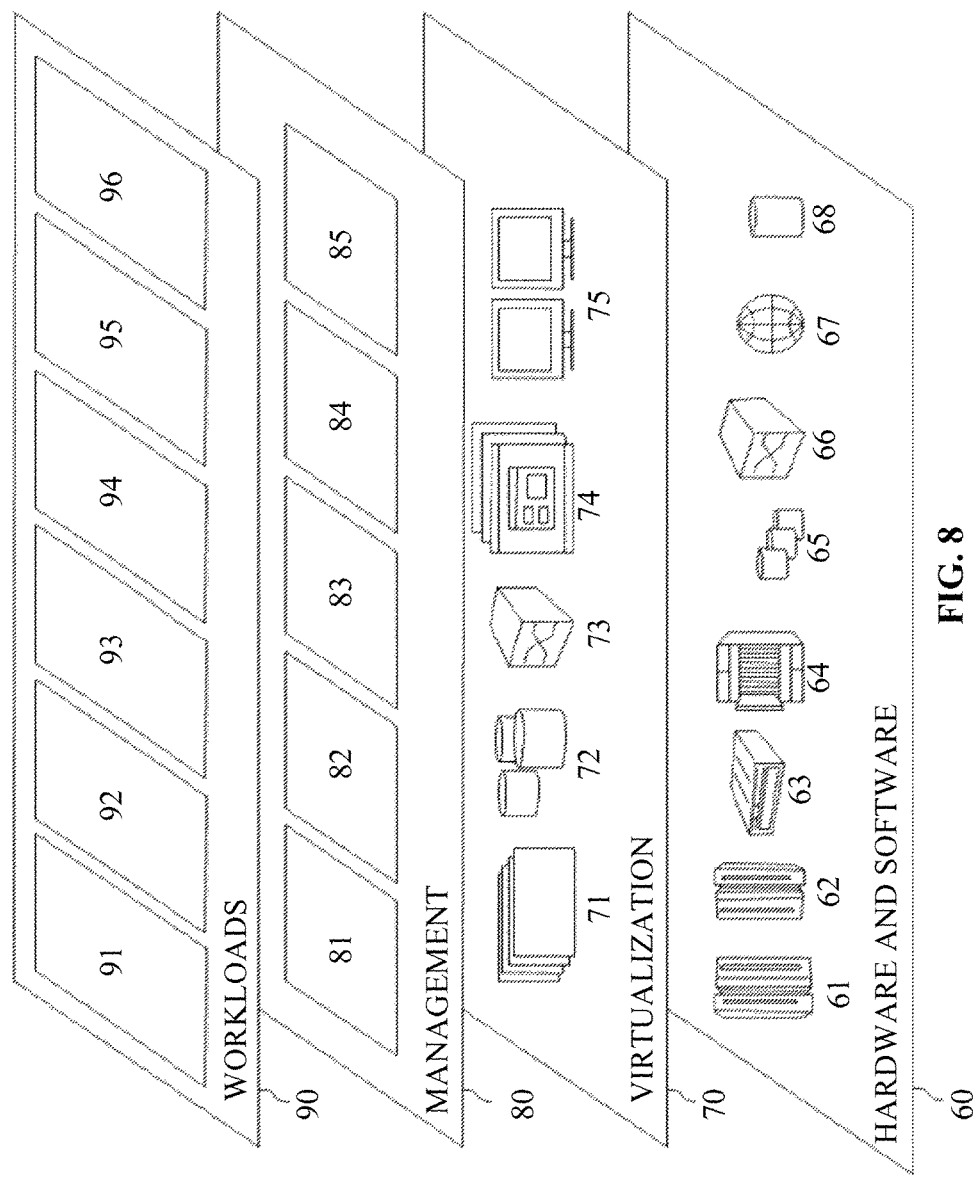
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, the TVT1 and TVT2 may be included in hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for translating an input/output (I/O) direct memory access (DMA) address to a physical system memory address in a data processing system, the method comprising:
receiving, from an I/O device,
a requester identity (RID) associated with a set of partitionable endpoint (PE) numbers, and
an I/O DMA address, the I/O DMA address comprising a translation validation table entry (TVE) offset and a translation control entry (TCE) table offset,
wherein an I/O subsystem of the data processing system is subdivided into multiple partitionable endpoints;
retrieving, from a first translation validation table (TVT1) and based on two or more PE numbers from the set of PE numbers, a TVT1 entry associated with each PE number from the set of PE numbers, the TVT1 combined with a requester identifier translation table of a host bridge, the TVT1 entry comprising,
a starting TVT1 index for a second translation validation table (TVT2), wherein TVT1 contains one or more TVT2 entry allocations for every PE number, and
a maximum size of a TCE table for TVT entries belonging to each PE number;
establishing, in TVT1, a first entry value indicating an allocation of a number of TVEs in TVT2 for a first PE;
establishing, in TVT1, a second entry value indicating an allocation of a number of TVEs in TVT2 for a second PE, wherein the first number of TVT2 entries is not the same as the second number of TVT2 entries;
validating, based on the TVT1 entry associated with the PE number, the maximum size of a TCE table value,
wherein the validating the maximum size of the TCE table value comprises validating the maximum size of the TCE table by a hypervisor of the data processing system,
wherein the hypervisor is a virtual machine monitor,
wherein the hypervisor is flexible in allocating a variable number of TVEs for each respective one or more PEs;
extracting, in response to the validating the maximum size of the TCE table, the TVE offset;
validating, based on the first entry value from the TVT1 entry, the extracted TVE offset;
assigning, based on the validating the extracted TVE offset, the extracted TVE offset from the I/O DMA address as an offset from the starting TVT1 entry index to access a corresponding entry in the TVT2;
accessing, based on the offset from the starting TVT1 entry index, the corresponding entry in the TVT2 (TVT2 entry), the TVT2 entry comprising a TCE table base address;
validating the TVT2 entry;
accessing, based on the validating of the TVT2 entry and using the TCE table offset from the I/O DMA address, a TCE table entry; and
retrieving, based on the TCE table entry, the physical system memory address.

2. The method of claim 1, further comprising:
receiving, from an I/O device,
a second RID associated with a second PE number, and a second I/O DMA address, the second I/O DMA address comprising a second TVT entry offset and a second TCE table offset;
retrieving, from the TVT1 and based on the second PE number, a second TVT1 entry associated with the second PE number, the second TVT1 entry containing,
a second starting TVT1 entry index for the TVT2,
a second entry value, the second entry value indicating a number of TVT entries allocated to the second PE number, and
a second maximum size of a second TCE table for TVT entries belonging to the second PE number;
detecting, based on the second TVT1 entry associated with the second PE number, the second maximum size of the second TCE table for TVT entries belonging to the second PE number is invalid; and
notifying, based on the detecting of invalidity, the hypervisor that an error has occurred.

3. The method of claim 1 further comprising initializing, by the hypervisor, the TVT1 entries for at least a first PE number.

4. The method of claim 1, wherein the TVT1 is a table in system memory of the data processing system.

5. A computer program product for translating an input/output (I/O) direct memory access (DMA) address to a physical system memory address in a data processing system, the computer program product comprising a computer readable storage medium having program instructions embodied therewith, wherein the computer readable storage medium is not a transitory signal per se, the program instructions executable by a computer processing circuit to cause the circuit to perform a method comprising:

receiving, from an I/O device,
a requester identity (RID) associated with a set of partitionable endpoint (PE) numbers, and
an I/O DMA address, the I/O DMA address comprising a translation validation table entry (TVE) offset and a translation control entry (TCE) table offset,
wherein an I/O subsystem of the data processing system is subdivided into multiple partitionable endpoints;
retrieving, from a first translation validation table (TVT1) and based on two or more PE numbers, from the set of PE numbers, a TVT1 entry associated with each PE number from the set of PE numbers, the TVT1 combined with a requester identifier translation table of a host bridge, the TVT1 entry comprising,
a starting TVT1 entry index for a second translation validation table (TVT2), wherein TVT1 contains one or more TVT2 entry allocations for every PE number,
and
a maximum size of a TCE table for TVT entries belonging to each PE number,
establishing, in TVT1, a first entry value indicating an allocation of a number of TVEs in TVT2 for a first PE;
establishing, in TVT1, a second entry value indicating an allocation of a number of TVEs in TVT2 for a second PE,
wherein the first number of TVT2 entries is not the same as the second number of TVT2 entries;
validating, based on the TVT1 entry associated with the PE number, the maximum size of a TCE table value,
wherein the validating the maximum size of the TCE table value comprises validating the maximum size of the TCE table by a hypervisor of the data processing system,
wherein the hypervisor is a virtual machine monitor,
wherein the hypervisor is flexible in allocating a variable number of TVEs for each respective one or more PEs;
extracting, in response to the validating the maximum size of the TCE table and from the I/O DMA address, the TVE offset;
validating, based on the first entry value from the TVT1 entry, the extracted TVE offset;
assigning, based on the validating the extracted TVE offset, the extracted TVE offset from the I/O DMA address as an offset from the starting TVT1 entry index to access a corresponding entry in the TVT2;
accessing, based on the offset from the starting TVT1 entry index, the corresponding entry in the TVT2 (TVT2 entry), the TVT2 entry comprising a TCE table base address;
validating the TVT2 entry;
accessing, based on the validating of the TVT2 entry and using the TCE table offset from the I/O DMA address, a TCE table entry;
retrieving, based on the TCE table entry, the physical system memory address;
receiving, from a second I/O device,
a second RID associated with a second PE number, and a second I/O DMA address, the second I/O DMA address comprising a second TVE offset and a second TCE table offset;
retrieving, from the TVT1 and based on the second PE number, a second TVT1 entry associated with the second PE number, the second TVT1 entry containing,
a second entry TVT index for the TVT2, a second entry value, the second entry value indicating a number of TVT entries allocated to the second PE number, wherein the second entry value indicates a different number of TVT entries than the first entry value, and a second maximum size of a second TCE table for TVT entries belonging to the second PE number;

detecting, based on the second TVT1 entry associated with the second PE number, that the second maximum size of the second TCE table for TVT entries belonging to the second PE number is invalid; and notifying, based on the detecting of invalidity, the hypervisor that an error has occurred.

6. The computer program product of claim 5, wherein the method further comprises initializing, by the hypervisor, the TVT1 entries for at least a first PE number.

7. The computer program product of claim 5, wherein the TVT1 is a table in system memory of the data processing system.

* * * * *